United States Patent
Nelson

(10) Patent No.: US 11,629,064 B2
(45) Date of Patent: Apr. 18, 2023

(54) RESIDENTIAL HOME WATER FILTER SYSTEM AND METHOD

(71) Applicant: Clinton D. Nelson, Wauconda, IL (US)

(72) Inventor: Clinton D. Nelson, Wauconda, IL (US)

( * ) Notice: Subject to any disclaimer, the term of this patent is extended or adjusted under 35 U.S.C. 154(b) by 0 days.

(21) Appl. No.: 17/205,236

(22) Filed: Mar. 18, 2021

(65) Prior Publication Data

US 2021/0292188 A1 Sep. 23, 2021

Related U.S. Application Data

(60) Provisional application No. 62/991,268, filed on Mar. 18, 2020.

(51) Int. Cl.
| | |
|---|---|
| *C02F 1/00* | (2006.01) |
| *C02F 5/00* | (2006.01) |
| *C02F 1/44* | (2006.01) |
| *C02F 1/42* | (2006.01) |
| *C02F 9/00* | (2006.01) |

(52) U.S. Cl.
CPC ............. *C02F 1/003* (2013.01); *C02F 1/001* (2013.01); *C02F 1/42* (2013.01); *C02F 1/441* (2013.01); *C02F 5/00* (2013.01); *C02F 9/005* (2013.01); *C02F 2001/425* (2013.01); *C02F 2303/22* (2013.01)

(58) Field of Classification Search
CPC .. C02F 1/001; C02F 1/003; C02F 1/42; C02F 1/441; C02F 2001/425; C02F 2303/22; C02F 5/00; C02F 9/005
See application file for complete search history.

(56) References Cited

U.S. PATENT DOCUMENTS

| | | | | |
|---|---|---|---|---|
| 8,679,347 | B2* | 3/2014 | Al-Samadi | B01J 49/75 |
| | | | | 210/636 |
| 2013/0032540 | A1* | 2/2013 | Acernese | B01D 61/025 |
| | | | | 210/652 |

FOREIGN PATENT DOCUMENTS

CN 205773884 U * 12/2016

* cited by examiner

*Primary Examiner* — Terry K Cecil

(74) *Attorney, Agent, or Firm* — Scherrer Patent & Trademark Law, P.C.; Stephen T. Scherrer; Monique A. Morneault

(57) ABSTRACT

The present invention relates to a residential home water filter system and method. The water filter system comprises a filter stage, a water purification stage, a water storage stage, and a back-up water softening stage, to deliver filtered and purified water to consumers when needed. Water from a pressurized water source first flows through filter 16 and then to a first junction 18 to a reverse osmosis system 22 when a pump 24 is activated or to an ion exchange water softener 20 when the pump 24 is deactivated. The filtered and purified water is then stored in tank 26.

5 Claims, 1 Drawing Sheet

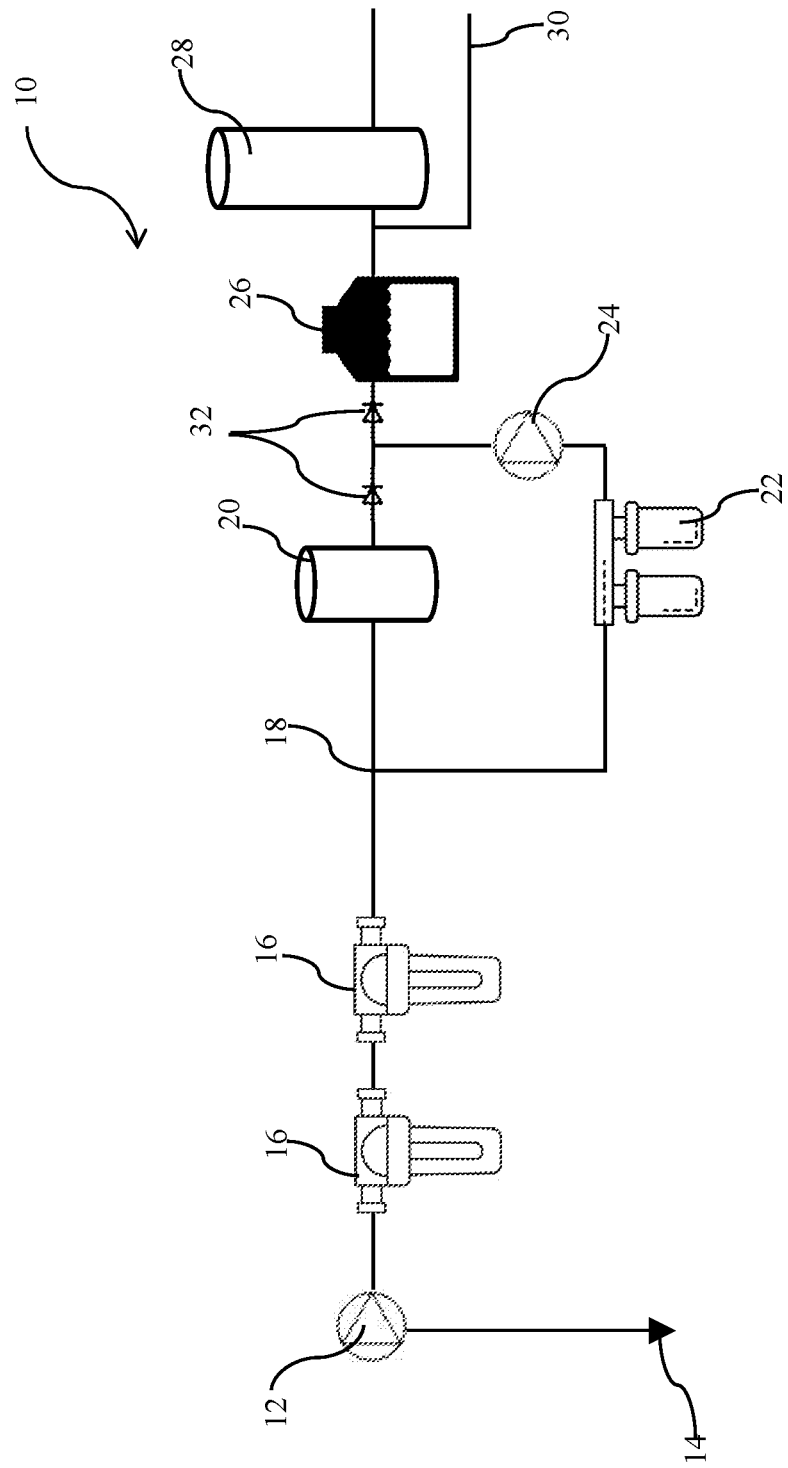

RESIDENTIAL HOME WATER FILTER SYSTEM AND METHOD

CROSS-REFERENCE TO RELATED APPLICATIONS

The present invention claims priority to U.S. Prov. Pat. App. No. 62/991,268, titled "Residential Home Water Filter System and Method," which is incorporated herein by reference in its entirety.

TECHNICAL FIELD

The present invention relates to a residential home water filter system and method. Specifically, the present invention comprises a water filter system comprising a filter stage, and a water purification stage, a water storage stage, and a back-up water softening stage, to deliver filtered and purified water to consumers when needed.

BACKGROUND

It is, of course, generally known to filter water delivered to residences. Oftentimes, when water is not pre-processed, such as via a municipal water treatment facility or the like, water must be filtered and/or purified at the site of use, such as in a residence. Oftentimes, water is drawn from the ground via a well, and may contain deleterious chemicals, colors, odors, particles, pathogens, or other like elements that can harm a user, or at least make the water undesirable.

In many places, for example, well water may be considered "hard", in that the water contains dissolved minerals, such as water that percolates through magnesium and/or calcium carbonates. Although hard water can be beneficial to health, it can cause problems with pipes and machinery, such as water heaters and the like. Lime scale deposits often form due to the presence of these minerals in hard water, and there are often problems associated with the formation of lime scale in pipes and machines.

A solution to the problem of hard water is the use of a water softener that replaces calcium or magnesium cations with sodium or potassium cations. Although this can effectively soften the water, and reduce issues associated with hard water, sodium is known as a health hazard if too much is consumed. Therefore, softening water through standard cation exchange can help, but may lead to other issues.

One solution is to use reverse osmosis to reduce or eliminate impurities in water. Oftentimes, however, reverse osmosis systems are large, cumbersome, and can be very expensive. In many cases, whole house reverse osmosis systems are utilized to provide on-demand purification of water, and must be able to handle large volumes of water, such as at peak water usage times, such as in the mornings or evenings during bathing times, or at other like times.

A need, therefore, exists for an improved residential purification water system. Specifically, a need exists for an improved residential water purification system that utilizes reverse osmosis to purify water for use thereof.

Specifically, a need exists for an improved residential water purification system that uses one or more small scale reverse osmosis systems to provide necessary water supply to a household, especially during peak times. More specifically, a need exists for an improved residential water purification system that is less expensive and less cumbersome to operate.

Moreover, a need exists for an improved residential water purification system that supplies the necessary water output for a typical family, but has a traditional back-up water softener system that may be utilized at peak capacity times.

SUMMARY OF THE INVENTION

The present invention relates to a residential home water filter system and method. Specifically, the present invention comprises a water filter system comprising a filter stage, and a water purification stage, a water storage stage, and a back-up water softening stage, to deliver filtered and purified water to consumers when needed.

To this end, in an embodiment of the present invention, a system for supplying purified water to a building is provided. The system comprises: a water source; a first junction to supply water from the water source alternately to a first water line leading to a reverse osmosis apparatus and to a second line leading to a water softener, wherein the first line leading to the reverse osmosis apparatus comprises a pump for increasing the pressure of the water in the first water line, wherein the water is supplied through the reverse osmosis apparatus when the pump is activated, and further wherein the water is supplied through the water softener when the pump is deactivated.

In an embodiment, the system further comprises: at least one filter between the water source and the first junction.

In an embodiment, the system further comprises: a pressurized tank configured to receive water from either the water softener or the reverse osmosis apparatus.

In an embodiment, the system further comprises: a second junction downstream from both the water softener and the reverse osmosis apparatus.

In an embodiment, the system further comprises: a pressurized tank downstream of the second junction, the pressurized tank configured to receive water from either the water softener or the reverse osmosis apparatus.

In an embodiment, the pressurized tank is configured to receive water from the reverse osmosis apparatus until a draw from the pressurized tank reduces the water in the pressurized tank to a pre-determined amount whereupon, when the water in the pressurized tank is reduced to the pre-determined level, the pressurized tank is configured to receive water from the water softener.

In an embodiment, the pre-determined amount is zero.

In an embodiment, the pressurized tank is configured to receive water from the reverse osmosis apparatus until a draw from the pressurized tank reduces the water in the pressurized tank to a pre-determined amount whereupon, when the water in the pressurized tank is reduced to the pre-determined level, the pressurized tank is configured to receive water from the water softener.

In an embodiment, the pre-determined amount is zero.

In an embodiment, the system further comprises: a water heater downstream of both the water softener and the reverse osmosis apparatus.

In an alternate embodiment of the present invention, a method of distributing purified water to a building is provided. The method comprises the steps of: providing a water source; providing a system for providing purified water to the building comprising a first junction to supply water from the water source alternately to a first water line leading to a reverse osmosis apparatus and to a second line leading to a water softener, wherein the first line leading to the reverse osmosis apparatus comprises a pump for increasing the pressure of the water in the first water line, wherein the water is supplied through the reverse osmosis apparatus when the pump is activated, and further wherein the water is supplied through the water softener when the pump is deactivated;

and supplying water from the water source to the building, wherein the water is purified through the reverse osmosis apparatus but not softened within the water softener or softened through the water softener but not purified through the reverse osmosis apparatus.

In an embodiment, the method further comprises the step of: providing a pressurized storage tank downstream of both the water softener and the reverse osmosis apparatus.

In an embodiment, the method further comprises the step of: filling the pressurized storage tank with water from either the reverse osmosis apparatus or the water softener.

In an embodiment, the method further comprises the step of: activating the pump and drawing water from reverse osmosis apparatus to fill the pressurized storage tank.

In an embodiment, the method further comprises the step of: de-activating the pump and drawing water from the water softener if a draw of the water from the pressurized storage tank causes the water within the pressurized storage tank to drop to a pre-determined level.

In an embodiment, the method further comprises the step of: activating the pump and drawing water from the reverse osmosis apparatus if the water within the water softener is above the pre-determined level.

In an embodiment, the method further comprises the step of: providing at least one filter between the water source and the first junction.

In an embodiment, the method further comprises the step of: providing a water heater downstream of both the reverse osmosis apparatus and the water softener.

In an embodiment, the method further comprises the step of: providing a second junction downstream both the reverse osmosis apparatus and the water softener.

In an embodiment, the method further comprises the step of: supplying purified water to the pressurized storage tank from the reverse osmosis apparatus through the second junction; and supplying softened water to the pressurized storage tank from the water softener through the second junction.

It is, therefore, an advantage and objective of the present invention to provide an improved residential water purification system.

Specifically, it is an advantage and objective of the present invention to provide an improved residential water purification system that utilizes reverse osmosis to purify water for use thereof.

Specifically, it is an advantage and objective of the present invention to provide an improved residential water purification system that uses one or more small scale reverse osmosis systems to provide necessary water supply to a household, especially during peak times.

More specifically, it is an advantage and objective of the present invention to provide an improved residential water purification system that is less expensive and less cumbersome to operate.

Moreover, it is an advantage and objective of the present invention to provide an improved residential water purification system that supplies the necessary water output for a typical family, but has a traditional back-up water softener system that may be utilized at peak capacity times.

Additional features and advantages of the present invention are described in, and will be apparent from, the detailed description of the presently preferred embodiments and from the drawings.

BRIEF DESCRIPTION OF THE DRAWINGS

The drawing FIGURES depict one or more implementations in accord with the present concepts, by way of example only, not by way of limitations. In the FIGURES, like reference numerals refer to the same or similar elements.

FIG. 1 illustrates an illustration of a system for purifying water in an embodiment of the present invention.

DETAILED DESCRIPTION OF THE PRESENTLY PREFERRED EMBODIMENTS

The present invention relates to a residential home water filter system and method. Specifically, the present invention comprises a water filter system comprising a filter stage, and a water purification stage, a water storage state, and a back-up water softening stage, to deliver filtered and purified water to consumers when needed.

Referring now to FIG. 1, a water purification system 10 is illustrated. The water purification system 10 comprises a water source, illustrated as a water pump 12 drawing water from a well 14; however, the water may come from any source, such as from municipal water treatment facilities, bodies of water, such as lakes, streams, rivers, and the like, or other like sources. The water may run through one or a plurality of filters 16 which may remove larger particles from the water, such as sand, sediments, and other like material.

After filtration through the one or more filters 16, the water may be diverted at junction 18 to either a water softener 20 or to a reverse osmosis apparatus 22. The water softener 20 may treat the water, as is typical of a water softener, such as through cation exchange, replacing calcium and magnesium cations with sodium or potassium ions. Alternatively, and preferably, the water may be diverted to the reverse osmosis apparatus 22, whereupon the water may be filtered through reverse osmosis media to form purified water. A pump 24 may be in line with water through the reverse osmosis apparatus to increase pressure of the water along the line through the reverse osmosis apparatus. Thus, water naturally flows through the reverse osmosis apparatus 22 unless the pump 24 is turned off, whereupon water will then flow through the water softener 20.

Therefore, when the pump 24 is activated, water is drawn from junction 18 to the reverse osmosis apparatus 22, whereupon the water is filtered, and then stored in water tank 26. Water tank 26 may have a pressurized bladder therein, and water may be drawn to water heater 28 for hot water product or via cold line 30 for cold water distribution throughout the residential house.

Therefore, during normal operation, pump 24 may pull water through the reverse osmosis apparatus to fill water tank 26, which may be sized as necessary to supply the water for the residential home for a period of time, such as for one day. For example, an on-demand reverse osmosis, which may be very expensive, is not necessary to supply the water to the home. Therefore, neither the reverse osmosis apparatus 22 nor the water tank 26 need be relatively large, as smaller and less expensive units may be utilized to supply the necessary household water for the day. When the water in the tank 26 is depleted after the period of time, then the pump 24 may replenish the water in the tank at low usage times, such as overnight when household members are sleeping and water usage level is very low.

At times when the water tank 26 is depleted, but additional water is needed, then the pump 24 may be de-activated, and the water may flow through the water softener 20 instead of the reverse osmosis apparatus 22, thereby providing soft water as traditionally supplied in a residential home. Check valves 32 may be utilized to ensure the flow of the water in the desired direction in various locations throughout the system, as described herein.

For example, water drawn from the well 14 may be pumped through pump 12 at between 35 and 45 psi. Water pumped through reverse osmosis apparatus 22 may be pressurized to 55-65 psi, thereby ensuring that the water flows through the reverse osmosis apparatus 22. When the water is fully depleted from the tank 26, or when determined via some other logic, the pump 24 may de-activate, and the water at 35-45 psi may flow through the water softener 20, thereby supplying additional softened water at peak times when the water tank 26 is depleted of water.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A system for supplying purified water to a building comprising:
    a pressurized water source;
    a first junction to supply water from the pressurized water source alternately to a first water line leading to a reverse osmosis apparatus and to a second water line leading to an ion exchange water softener;
    at least one filter between the pressurized water source and the first junction;
    a pressurized tank configured to receive water alternately from the ion exchange water softener and the reverse osmosis apparatus via a second junction, wherein the reverse osmosis apparatus supplies water to the pressurized tank through the second junction via a third water line, and wherein the ion exchange water softener supplies water to the pressurized tank through the second junction via a fourth water line,
    wherein the third water line leading to the second junction from the reverse osmosis apparatus comprises a pump for increasing the pressure of the water through the first water line,
    wherein the water is supplied through the reverse osmosis apparatus when the pump is activated to fill the pressurized tank, and further wherein the water is supplied through the ion exchange water softener to fill the pressurized tank when the pump is deactivated,
    wherein the pump is deactivated when the water in the pressurized tank supplied by the reverse osmosis apparatus is depleted to a predetermined amount thereby filling the pressurized tank with water from the ion exchange water softener.

2. The system of claim 1 wherein the pre-determined amount is zero.

3. The system of claim 1 further comprising:
    a water heater downstream of both the ion exchange water softener and the reverse osmosis apparatus.

4. A method of distributing purified water to a building comprising the steps of:
    providing a pressurized water source;
    providing a system for providing purified water to the building comprising a first junction to supply water from the pressurized water source alternately to a first water line leading to a reverse osmosis apparatus and to a second water line leading to an ion exchange water softener, at least one filter between the pressurized water source and the first junction, a pressurized tank configured to receive water alternately from the ion exchange water softener and the reverse osmosis apparatus via a second junction, wherein the reverse osmosis apparatus supplies water to the pressurized tank through the second junction via a third water line, and wherein the ion exchange water softener supplies water to the pressurized tank through the second junction via a fourth water line, wherein the second line leading to the reverse osmosis apparatus comprises a pump for increasing the pressure of the water in the first water line, wherein the water is supplied through the reverse osmosis apparatus when the pump is activated to fill the pressurized tank, and further wherein the water is supplied through the ion exchange water softener to the pressurized tank when the pump is deactivated;
    supplying water from the pressurized water source to the building, wherein the water is purified through the reverse osmosis apparatus but not softened within the ion exchange water softener or softened through the ion exchange water softener but not purified through the reverse osmosis apparatus;
    activating the pump to supply water from the reverse osmosis apparatus to the pressurized tank;
    drawing water from the pressurized tank to distribute around the building;
    deactivating the pump when the water in the pressurized tank supplied by the reverse osmosis apparatus is depleted to a predetermined amount; and
    filling the pressurized tank with water from the ion exchange water softener.

5. The method of claim 4 further comprising the step of:
    providing a water heater downstream of both the reverse osmosis apparatus and the ion exchange water softener.

* * * * *